M. E. SHERLAND.
LEAK STOPPER.
APPLICATION FILED OCT. 23, 1911.
1,041,891.
Patented Oct. 22, 1912.
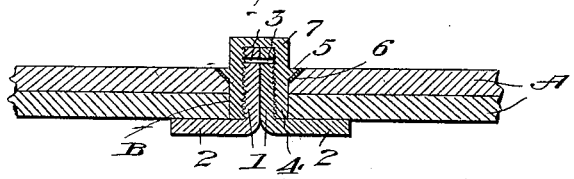
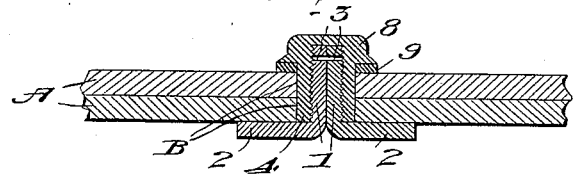
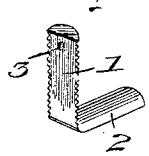 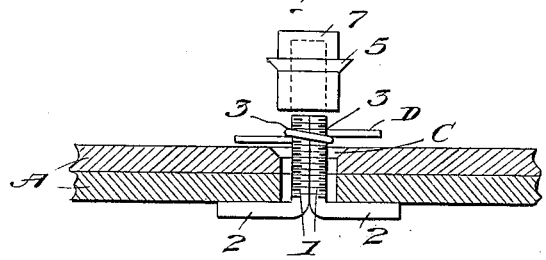 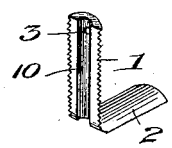
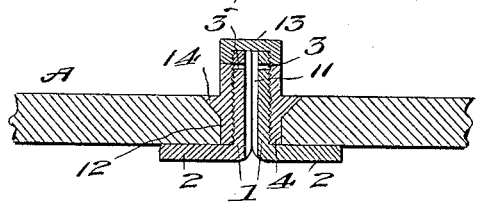
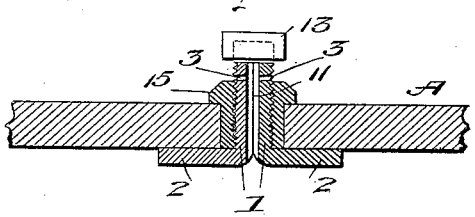
WITNESSES
Mark E. Sherland INVENTOR
Herman A. Phillips Attorney

UNITED STATES PATENT OFFICE.

MARK E. SHERLAND, OF McGEHEE, ARKANSAS, ASSIGNOR OF ONE-HALF TO ENSLEY E. WILLIAMS, OF McGEHEE, ARKANSAS.

LEAK-STOPPER.

1,041,891.           Specification of Letters Patent.          Patented Oct. 22, 1912.

Application filed October 23, 1911. Serial No. 656,273.

*To all whom it may concern:*

Be it known that I, MARK E. SHERLAND, a citizen of the United States, residing at McGehee, county of Desha, and State of Arkansas, have invented certain new and useful Improvements in Leak-Stoppers, of which the following is a specification.

This invention relates to leak stoppers.

The invention has for its object the provision of a leak stopper of novel construction having means whereby it may be temporarily held in position until the nut can be applied thereto; will be constructed in a new manner, where necessary or desired, so that it may be used as an outlet or cap; and to provide, as a part thereof a sleeve nut adapted to clamp or secure the stopper in position and to enter the boiler plates in a new manner and to be used separate from, or in connection with, a cap.

In carrying out the invention the features above enumerated need not all be included in one embodiment of the device, the invention being susceptible of various modifications, as will appear more fully hereinafter.

In the accompanying drawings:—Figure 1 is a vertical section through one form of the invention; Fig. 2, a similar view of a modification; Fig. 3, a view showing the manner in which the bolt may be held to permit the application of the nut; Fig. 4, a perspective detail of one of the halves of the bolt; Fig. 5, a vertical section of another modification; Fig. 6, a similar view of a further modification; and Fig. 7, a perspective of one of the halves of the bolt of Figs. 5 and 6.

In the practical embodiment of my invention, I provide a repair bolt having its bolt proper comprising two half-round bolt parts 1 threaded on their outer curved surfaces, and provided with abutting flat surfaces. The bolt parts 1 are provided with extensions 2 at right angles thereto. The bolt parts 1 are further provided with openings 3 transversely therethrough adjacent their upper ends adapted to aline with one another when said bolt parts are assembled with their flat faces abutting one another.

In the practical embodiment of my invention and when there occurs a leak or small opening in boiler sheets, tubes or the like A, said leak is reamed out to form a substantially circular opening B of a desired diameter which may or may not have a countersunk portion C formed in the external surface of the part A adjacent said opening depending upon the style of nut desired to be used in connection with said bolt. The opening B is preferably reamed to a diameter substantially greater than the diameter of the combination bolt parts 1 to insure of the ready insertion therethrough of said bolt parts and their angular extensions 2, to the position shown in Fig. 3, when a wire or the like D may be inserted through the alined openings 3 and given a half turn around said bolt parts in order to hold the same in position while the nut is started thereon. The enlarged diameter of the opening B permits of the internally threaded sleeve portion 4 of the several nuts to extend inwardly between said bolt parts 1 and the wall of said opening B, with its edge resting upon the angular portions 2. The nut may be in the form shown in Figs. 1 and 3 in which the same is provided with a circular outstanding beveled flange 5 adapted to engage within the countersunk portion C, between which countersunk portion and said beveled flange a washer 6 may be disposed, said nut being provided with a squared closed upper end 7 above said flange by which the same may be screwed into position. The nut, on the other hand, may be of the form shown in Fig. 2 in which the same is provided with an enlarged closed head 8 having a washer 9 disposed between the same and the part A about the sleeve portion 4.

In the modification shown in Figs. 5, 6 and 7, I provide the flat surfaces on each of the bolt parts 1 with longitudinally extending semicircular grooves 10 to form a substantial circular opening 11 when said parts are assembled in position so that the device may be used as a tap. In this form I provide clamping means comprising sleeve nuts 12 and cap nuts 13. In the form shown in Fig. 5 the sleeve nut 12 extends downwardly between the bolt parts 1 and the wall of the opening B in the part A and is provided with a circular outstanding beveled flange 14 corresponding to the flange 5 on the nuts shown in Figs. 1 and 3 and adapted to enter a countersunk portion similar thereto. The cap nut 13 closes the end of the bolt and its opening 11, being readily and easily removed in case a tap is wanted for any purpose. The form shown in Fig.

6 comprises a sleeve nut 12 having an enlarged head 15 similar to the enlarged head 8 of the form shown in Fig 2, said enlarged head bearing upon the material of the part A surrounding its opening B. The cap nut 13 is similar to the one employed in Fig. 5 and closes the end of said bolt and its opening 11 and may be similarly removed when desired.

Having thus described my invention, what I claim as new and desire to secure by Letters Patent, is:—

1. In a leak stopper for boilers, pipes, or the like, the combination of a pair of bolt parts having abutting flat faces, having angular extensions at one end thereof, and having their outer curved faces threaded up to said extensions, and a tubular nut adapted to be screwed upon the threaded ends of said bolt parts, and to abut said angular extensions, said nut having an outstanding portion.

2. In a leak stopper for boilers, pipes, or the like, the combination of a two part bolt proper, each of said parts having an angular extension at one end thereof, and means for clamping said bolt comprising a sleeve nut to screw about said parts, and having an outstanding portion adapted to enter a recess in the boiler, pipe, or the like to which the stopper is secured, and a cap nut to screw upon the end of said bolt against said sleeve nut.

3. In a leak stopper, the combination of a two part bolt proper, each of said parts having a semicircular groove to aline with the groove in the opposing part and to form an opening through the bolt when said parts are assembled, each of said parts being furthere provided with an angular extension at one end thereof, and means for clamping said bolts together comprising a sleeve nut to screw downwardly thereon against said extensions and provided with an outstanding portion, and a cap nut to screw upon said parts against said sleeve nut to close said opening through said bolt.

4. In a leak stopper, the combination with a bolt composed of independent members each of angular form, the corresponding legs of which are screw threaded, of a nut adapted to engage the screw threaded legs and to clamp them together, said nut and screw threaded legs being so constructed and related that the nut is adapted to surround the legs where they pass through the member to which the leak stopper is applied.

5. In a leak stopper, the combination with independent angular members each having a leg provided with screw threads and both having flattened abutting faces, said legs being provided with alined transverse apertures adapted for the reception of a temporary holding member, of a nut adapted to clamp the parts of the shank together and secure the angular members in position.

In testimony whereof, I hereunto affix my signature in presence of two witnesses.

MARK E. SHERLAND.

Witnesses:
E. E. WILLIAMS,
P. S. SEAMANS.

---

Copies of this patent may be obtained for five cents each, by addressing the "Commissioner of Patents, Washington, D. C."